Sept. 6, 1966 J. RABINOW 3,271,740

IMAGE REGISTRATION SYSTEM USING AN IMAGE CONVERTER TUBE

Filed April 29, 1963

INVENTOR
Jacob Rabinow

BY Joseph A. Genovese & Max L. Libman

ATTORNEYS

United States Patent Office 3,271,740
Patented Sept. 6, 1966

3,271,740

IMAGE REGISTRATION SYSTEM USING AN IMAGE CONVERTER TUBE

Jacob Rabinow, Bethesda, Md., assignor, by mesne assignments, to Control Data Corporation, Minneapolis, Minn., a corporation of Minnesota Filed Apr. 29, 1963, Ser. No. 276,471
2 Claims. (Cl. 340—146.3)

Figures 1, 1A:
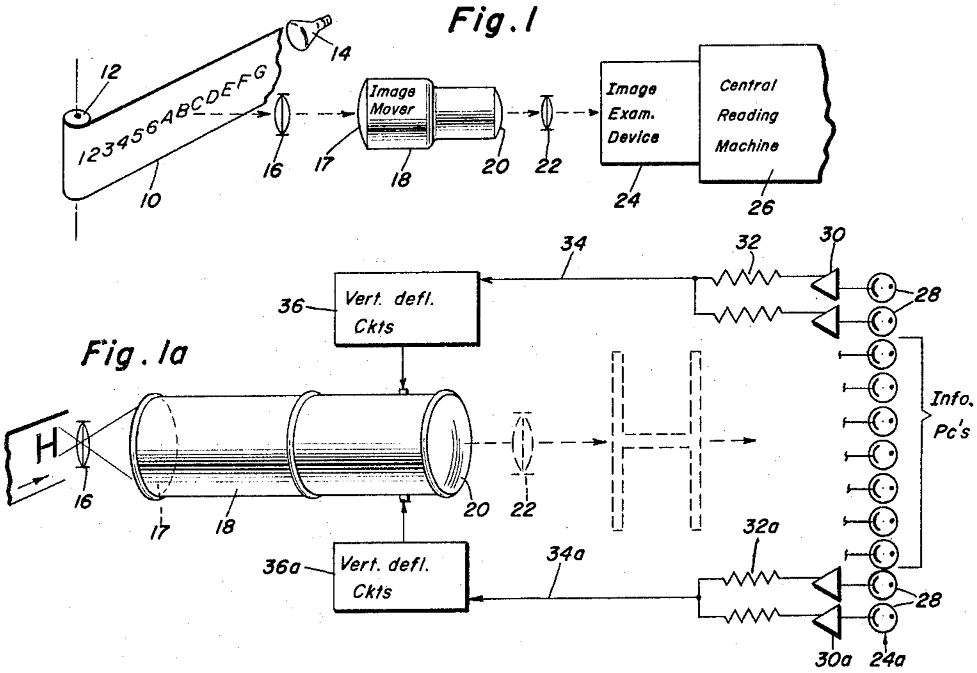

This invention relates to character recognition machines and particularly to methods of greatly reducing character image registration problems peculiar to optical character recognition machines.

At this stage in the art, a number of different kinds of reading machines have been constructed or otherwise disclosed. Many operate on widely different principles, for instance, "area comparison" machines as disclosed in Rabinow et al., Patent No. 3,104,369 (using electronic masks), and in the Rabinow Patent 2,933,246 (using optical masks). Other machines analyze features or strokes of characters, while others use curve tracing techniques, such as in Holt Patent No. 3,142,818. Each has its advantages and disadvantages. However, all machines of which I am aware experience difficulty when the unknown character image fails to register with the electronic mask, the optical mask, and/or the scanner or other means of extracting information from the unknown character image, regardless of the type of machine with which the scanner is associated.

My invention deals with the problem of assuring registration between the image of an unknown character and the character-examination device (usually a scanner) and ultimately, registration with the electronic logic or optical masks of the machine. It is apparent that if the image of an unknown character is only partially within the field of view of a scanner, the logic circuits of the reading machine cannot function properly due to a lack of sufficient scan-data on which to base a proper character-decision. Since this difficulty is more readily visualized in a reading machine which uses optical masks, the following example of my invention deals with optical mask reading machines.

In examining the image of an unknown character, there is ordinarily no problem in registering the image in one direction with the mask of the machine because it is customary to depend on motion of the document in one direction (for instance horizontal motion) to sweep the image of the character across the mask. However, registering the image of the unknown character with the mask in a vertical direction presents a problem. This problem has been known for a long time, for instance, see the Rabinow Patent No. 2,795,705, filed in 1952, which discusses the same problem. My approach at that time was to use several vertically displaced masks of each unknown character—at the expense of character-recognition speed. For a long time I had known that a reflective surface could be tilted to achieve similar results, but oscillating a mirror is time consuming.

Accordingly, an object of my invention is to provide an image converter in the optical path between the unknown character and the information extraction means of a character-recognition machine, and to electronically introduce an additional component of motion (e.g. vertical) to the character image at sufficiently high speeds so that my improvement may be applied to all basic kinds of reading machines of which I am aware.

I have indicated above that considerable thought has been given to the problem of vertical registration in reading machines and that comparatively slow, usually mechanical solutions have been suggested. Probably the most practical prior suggestion is an oscillating mirror, but it has inherent speed limitations. Another factor is that the motion of a mirror ordinarily has to be in one direction only, otherwise the comparatively low terminal speed (using reasonable drivers for the mirrors) is further reduced.

A feature of my invention is that I can introduce components of motion to the image in any direction, even parallel to the document-motion (direction of movement of the unknown character image) which would have the effect of decelerating or even instantaneously stopping a character image on the examination device (usually a scanner) of a reading machine. Of course, the images of characters on a stationary document can be moved in any direction by my invention.

The term "examination device" embraces scanners in the usual sense of photosensitive means for making a point-by-point or line-by-line examination of an area, and also scanners in the less common sense of a concurrent full-area examination such as photocell mosaics and optical mask comparisons.

As mentioned before, my invention can be applied to all optical character reading machines, although the optical mask machine may have a greater need for my invention for the following reasons. Area correlation, feature analysis, curve tracing machines, etc. are generally (not always) provided with short-term digital storage registers in which the character-defining data can be shifted around (as in Rabinow et al. Patent No. 3,104,369) to eliminate the registration problem. But, shifting in this manner presupposes a digital register which is an expensive component. Most mask machines are largely analog machines, and generally they have no element by element, or feature by feature storage register. However, even with machines capable of shifting the character-defining data, my invention has merit because the register shifting feature can be eliminated, or reduced greatly (reducing the size and capacity of the register). In addition to the above, there are many second-order advantages flowing from my invention which registers the character image with the machine examination device without requiring any special provision in the central logic of the reading machine.

Another object of my invention is to introduce components of character-image motion in one or more directions while the image of the unknown character is being swept in its prescribed path by means of the document mover or other device which ordinarily causes one direction of scan motion of the unknown character.

Another object of the invention is to provide electro-optical means for displacing a character image during examination thereof by reading machines, and to amplify and/or otherwise control the brightness of the image.

In practice of my invention, I use an image converter tube where the image of the unknown character is formed on a photocathode screen and is electronically projected within the tube to a phosphor display screen. This kind of tube differs from an ordinary television picture tube in that there is no scanning. Instead, an image converter transfers a complete light image from the photocathode to the phosphor screen. Some of the image converter tubes manufactured by RCA are equipped with means to intensify the light. Thus, I can begin with a comparatively low intensity image of the unknown character (and its background) on the document and project a brighter image on the scanner or mask of the reading machine. Oscillating mirrors, of course, are incapable of this.

With the above facility available in the image converter tube, I can achieve another important result. By using a comparatively simple electro-optical servo, I am able to automatically control the gain of the image converter tube so that the intensity of the image of each unknown character (of the same or successive documents) on the phosphor screen is constant. This feature (i.e., adjusting the light level of the image before it reaches the photosensitive device or devices of the reading machine) greatly aids the recognition circuits of a reading machine. In fact, in machines that use digital logic circuis, quantizing becomes far more reliable when the light intensity of the character background in the image is kept constant, as by my servo feature.

Other objects and features of importance will become evident to those skilled in the art in following the description of the illustrated forms of the invention which are given by way of example only.

FIGURE 1 is a diagrammatic view of a basic reading machine system using my image deflecting device.

FIGURE 1*a* is a diagrammatic view showing my invention used with one kind of examination device of a reading machine.

Figure 1B:
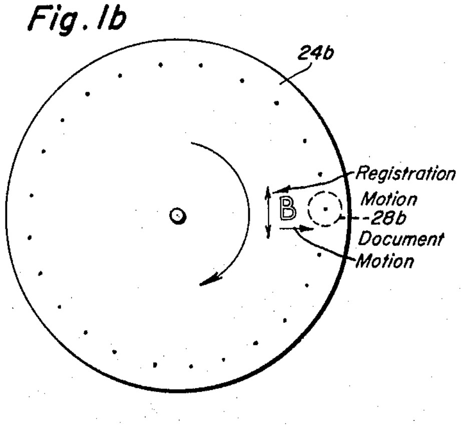

FIGURE 1*b* is a view showing a modification.

Figure 1C:
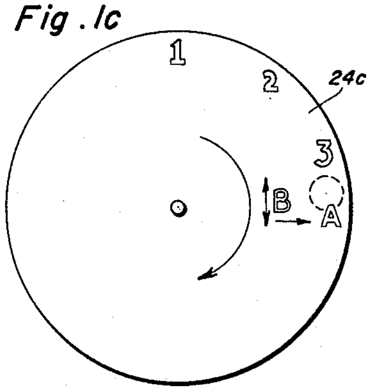

FIGURE 1*c* is a schematic view showing another modification.

Figure 2:
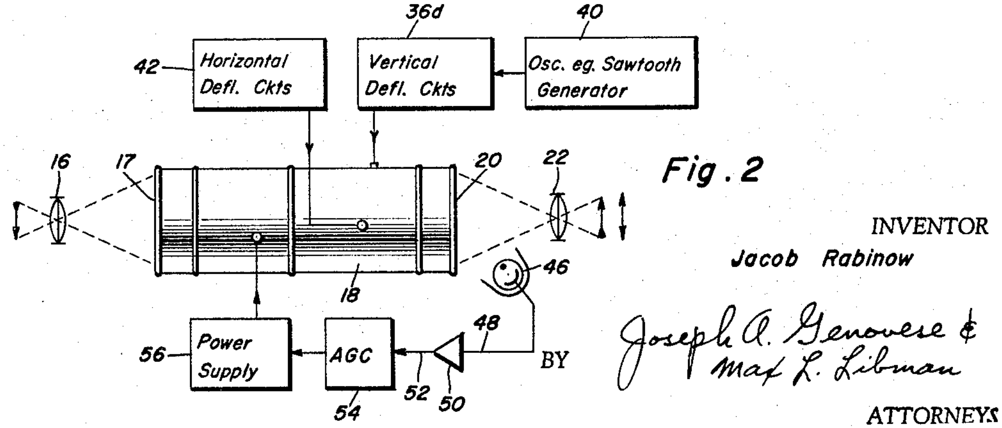

FIGURE 2 is a schematic view showing a modification of my invention.

FIGURE 1 shows document 10 moving horizontally by means of a conventional document mover 12, which is schematically shown since the details thereof form no part of my present invention. The surface of the document is illuminated by lamp 14, and an image of the character-area is projected by an optical system represented by lens 16 onto the photocathode screen 17 of an image converter tube 18. Examples of such tubes are the electrostatically focused and deflected RCA tube No. 4449, and the electromagnetically focused and deflected RCA Tube No. C70012. Either can be used, but to simplify the disclosure I show only the electrostatically controlled tube. In either case, tube 18 forms an image (usually intensified) on its phospor viewing screen 20. An optical system, represented by lens 22, is optically aligned with screen 20 to form an image of the screen on the examination device 24 of a reading machine 26. Thus, horizontal motion of document 10 provides one component of character-image movement, while the image converter 18 provides movement for at least vertical registration, as described below in connection with FIGURES 1*a*–2.

FIGURES 1*a*–1*c* show three different kinds of character-image examination devices **24*a*, 24*b* and 24*c*** with which my invention is used, and it is understood that my invention can be applied to machines with other kinds of examination devices.

First consider FIGURE 1*a*. The image of the character-area is formed on the photocathode screen 17, and a new image is formed by photocathode emission on phosphor screen 20. The new image is formed, by lens 22, on the examination device **24*a* made of a vertical row of photocells 28, e.g. as in U.S. Patent No. 3,104,369 of Rabinow et al. Thus, as the document moves horizontally, an image of the character-area (formed by tube 18) sweeps horizontally across the photocells 28 of examination device 24*a***.

The center photocells 28 are used to extract information from the character-area in any suitable manner, and the two upper and the two lower photocells are used to provide vertical positional signals to shift the image on screen 20 up or down for vertical registration with the information photocells. The upper photocells are connected to amplifiers 30 whose output lines are connected to a resistor adder 32. The output line 34 of adder 32 provides a signal to control the operation of vertical deflection circuits 36. These are connected to one of the vertical deflection circuits terminals of tube 18. Amplifiers 30 are designed (or adjusted) to provide a signal when their photocells detect a part of the character image ("black") and no signal when they detect the character background ("white"). The lower photocells are connected, in a like manner, to amplifiers **30*a*, adder 32*a* and vertical deflection circuits 36*a* via line 34*a*. Thus, if the character image on screen 20 is too low on scanner 24*a*, the signal originating from the lower photocells deflects the image on screen 20 vertically upward by means of circuits 36*a* which are connected to the other vertical deflection terminal of tube 18. The vertical deflection circuits 36 and 36*a* can be coupled so that they operate in unison to provide an average signal if both ends of the scanner 24*a*** are effected.

FIGURE 1*b* shows an apertured disc as examination device **24*b*. Photocell 28*b* is located behind one face of the disc, and the image of the character area (as it appears on screen 20, not shown in this view) is formed on the opposite face of the scanning disc. Horizontal motion of the character image on disc 28*b*** is produced by document motion, while vertical registration motion is obtainer by vertical deflection signals derived in a manner similar to FIGURE 1*a* or in other ways giving equivalent results.

FIGURE 1*c* shows an examination device **24*c*** which can be considered similar to the optical mask dics in the Rabinow Patent No. 2,933,246 where a rotating disc has an optical mask to correspond to each character that the machine is expected to identify. Other optical mask arrangements, e.g. a stationary matrix thereof as in Patent No. 3,167,744 of J. Rabinow can be used. In any case, my invention solves one of the most trying problems of optical mask machines, and that is the vertical registration difficulties. As shown in FIGURE 1*b*, the image of the unknown character moves horizontally due to document-movement, and is vertically positioned by vertical deflection signals obtained from positional information photocells, or by an oscillator like that shown at 40 in FIGURE 2.

FIGURE 2 shows a comprehensive system, where, among other features, the vertical deflection circuits **36*d* are driven by oscillator 40, e.g. a saw tooth or sine wave generator. Accordingly, the image of the character area on phosphor screen 20** is vertically oscillated. This mode of vertical movement is particularly useful in optical mask machines where recognition signals are obtained when the entire image registers with its mask, even though registration exists for only a brief period.

FIGURE 2 shows other features which can be omitted or used with many kinds of reading machines and/or examination devices. One feature is the use of horizontal deflection circuits 42 connected to the horizontal deflection terminal of tube 18 (if the selected image converter is not equipped with horizontal deflection plates, two converters arranged end-to-end with one rotated 90° can be used). The horizontal deflection circuits can be driven by a variety of means such as positional information photocells, or an oscillator, etc., depending on the desired results. With both vertical and horizontal deflection capabilities the image on screen 20 can be moved in any direction or be made to momentarily stand still (by a horizontal signal component producing image-motion the same speed as document movement but in the opposite direction). Moreover, image converter tubes can also change the size of the image on their viewing screens thereby providing the additional advantage of normalizing the character images seen by the scanner.

Another feature shown in FIGURE 2 and applicable to all forms of my invention is the regulation of light intensity of the image appearing on screen 20. As mentioned before, many image converter tubes have at least one stage of amplification whereby the image of screen 20 is brighter than the image on the photocathode. This is an excellent feature for reading machines because many machines require so much light on the document that the document actually burns if it is stopped. Accordingly, I have photocell 46 arranged to examine a part or the entire area of screen 20, and provide a signal on line 48 which corresponds to the average or over-all level of light intensity of screen 20. The signal on line 48 is amplified at 50, and the amplified signal on line 52 operates a conventional automatic gain control for the power supply 56 of tube 18. Thus, the intensity of the image formed on screen 20 is servoed to a predetermined level, thereby simplifying the task of reading both light and dark characters.

It is understood that the foregoing is given by way of examples of my invention, and that various changes may be made without departing from the protection of the following claims.

I claim:

1. In an optical character reading machine for characters on a contrasting background, an image converter tube having a photosensitive emissive surface, means to form a first image of one of said characters on said surface, said tube having a second surface and means responsive to the emissions from said photosensitive surface to form a second image of said character on said second surface, said reading machine including means for examining the character whose image appears on said second surface, optical means in optical alignment with said second surface and said examining means to form an image of the last mentioned character on said examining means for examination by the latter, said image converter tube having vertical deflection means to vertically move the image appearing on said second surface, means including a vertical deflection driving circuit connected to said deflection means to drive said vertical deflection means and thereby vertically move said second image, said tube having a power input terminal, a power supply connected to said terminal, means for controlling the gain of said power supply to thereby regulate the intensity of said second image, photosensitive means exposed to said second surface and arranged to provide a signal corresponding to the light intensity of said second surface on which said second image appears, and means for conducting said signal to said gain controlling means to control the latter.

2. The object matter of claim 1 wherein said image converter tube has horizontal deflection means operable between said first and said second surfaces, and means including a horizontal deflection circuit connected with said horizontal deflection means for deflecting said second image at an angle to the vertical motion of said second image.

References Cited by the Examiner

UNITED STATES PATENTS

| | | | |
|---|---|---|---|
| 2,894,247 | 7/1959 | Relis | 340—146.3 |
| 3,111,647 | 11/1963 | Heizer | 340—146.3 |
| 3,197,735 | 7/1965 | Haynes et al. | 340—146.3 |

MAYNARD R. WILBUR, *Primary Examiner.*

DARYL W. COOK, MALCOLM A. MORRISON, *Examiners.*

J. E. SMITH, J. S. IANDIORIO, *Assistant Examiners.*